(12) United States Patent
Wichmann et al.

(10) Patent No.: US 9,355,229 B2
(45) Date of Patent: May 31, 2016

(54) METHOD FOR PROTECTING AN APPLICATION PROGRAM AND RELATED COMPUTER PROGRAM PRODUCT

(75) Inventors: Peer Wichmann, Bruchsal (DE); Alexander Schmitt, Sinsheim-Reihen (DE)

(73) Assignee: WIBU-Systems AG, Karlsruhe (DE)

( * ) Notice: Subject to any disclaimer, the term of this patent is extended or adjusted under 35 U.S.C. 154(b) by 210 days.

(21) Appl. No.: 13/976,465

(22) PCT Filed: Jan. 13, 2012

(86) PCT No.: PCT/EP2012/050489
§ 371 (c)(1),
(2), (4) Date: Oct. 10, 2014

(87) PCT Pub. No.: WO2012/095515
PCT Pub. Date: Jul. 19, 2012

(65) Prior Publication Data
US 2015/0033354 A1    Jan. 29, 2015

(30) Foreign Application Priority Data

Jan. 14, 2011  (EP) ...................................... 11150910

(51) Int. Cl.
*G06F 21/00* (2013.01)
*G06F 21/14* (2013.01)
*G06F 9/445* (2006.01)

(52) U.S. Cl.
CPC  *G06F 21/14* (2013.01); *G06F 8/54* (2013.01); *G06F 9/44521* (2013.01)

(58) Field of Classification Search
USPC ..................................... 726/26; 717/140, 163
See application file for complete search history.

(56) References Cited

U.S. PATENT DOCUMENTS

| | | | |
|---|---|---|---|
| 2005/0183072 A1* | 8/2005 | Horning et al. ................ | 717/140 |
| 2006/0070053 A1* | 3/2006 | Andersen et al. ............. | 717/163 |
| 2008/0216051 A1* | 9/2008 | Johnson .................. | G06F 21/14 |
| | | | 717/110 |
| 2015/0033354 A1* | 1/2015 | Wichmann .......... | G06F 9/44521 |
| | | | 726/26 |

OTHER PUBLICATIONS

Collberg, Christian, et al., "A Taxonomy of Obfuscating Transformations," Technical Report #148, Department of Computer Science, The University of Auckland, New Zealand, Jul. 1, 1997, 36 pages.
International Search Report received in Patent Cooperation Treaty Application No. PCT/EP2012/050489, dated Mar. 9, 2012, 3 pages.

* cited by examiner

*Primary Examiner* — Jason Lee
(74) *Attorney, Agent, or Firm* — Hubbard Law, PLLC

(57) ABSTRACT

A Method for protecting an application program executable on a computer against reverse engineering, said application is created to run with at least one selected dynamic link library (DLL) on said computer, comprises the steps of: adding a specific library loader to the executable application program, said loader either contains or has access to said dynamic link library; setting modified references to said dynamic link library such that upon loading said application program and said loader into the main memory of said computer, said dynamic link library is initialized by said library loader instead of the operating system; The library loader and the pseudo-statically linked library could be embedded into the application program, thereby using unused space within the application. The protected application presents itself as a monolithic application without the vulnerable interface to a DLL.

22 Claims, 3 Drawing Sheets

METHOD FOR PROTECTING AN APPLICATION PROGRAM AND RELATED COMPUTER PROGRAM PRODUCT

RELATED APPLICATION

This application, a national phase application of PCT/EP2012/050489, filed Jan. 13, 2012, claims priority to European Application No. 11150910.5 filed Jan. 14, 2011.

The invention relates to protecting an application program executable on a computer against reverse engineering.

Current application programs usually not only use code specially crafted for this application but also some generic code that is to be re-used for a plurality of applications. Such code is called a library. Common uses for libraries are on one hand system specific application programming interfaces (APIs) such as drawing on a screen, sound output or writing files to disk. There also exist a number of libraries that are provided either commercially or free of charge to perform special frequently used functionality. For example, this could be an interface to a database system, a cryptographic library performing some encryption task, or a library used for accessing special hardware.

Libraries can be provided to the programmers (and user) in different form. These different forms have different properties with different advantages and drawbacks. On different platform the different types of libraries have slightly different properties but the basic concepts remain the same across all platforms. In the following the naming for a windows platform is used as these names are the most commonly used names.

The simplest form to distribute code is in form of source code. Here the library developer distributes the whole source code of the library to application developers. This has some advantages:

1. The application developer has access to the complete library and it is easier for him to find errors in his own application or in the library.
2. The application developer can make changes to the library (if licensing terms permit this).
3. The application can be a single file and there is no separate file that is added to the application by using the library.
4. The application is well protected against reverse engineering as the APIs are not visible outside the application.
5. Only the necessary code enters the application. Code that is not necessary will not enhance the size of the application.

To distribute libraries in form of source code also involves some significant disadvantages:

1. The library developer cannot keep the internals of his library secret.
2. The implementation will probably work only with one specific programming language, compiler, and version. For different languages, compilers, or versions there has to be different source code.
3. A correction in the library requires a fresh build of the application.
4. If multiple applications use the same library, it requires more disk space as each application has its own copy of the library already build in.

A static link library (SLL) is provided as the output of the compiler and can be used in generating a complete executable. In contrast to a source code library it is not possible to see every detail of the implementation or to easily make changes or corrections to the existing library code.

Advantages of SLLs are:

1. The library developer can keep the internals of his library secret.
2. The application can be a single file and there is no separate file that is added to the application by using the library.
3. The application is well protected against reverse engineering as the APIs are not visible outside the application.
4. Only the necessary code enters the application. Code that is not necessary will not enhance the size of the application.

The disadvantages are the following:

1. The application developer cannot make changes to the library.
2. The application developer has no access to the complete library. It is not easy for him to find errors in the library.
3. The implementation will probably work only with one specific programming language, compiler, and version. For different languages, compilers, or versions there have to be different libraries.
4. A correction in the library requires a fresh build of the application.
5. If multiple applications use the same library, it requires more disk space as each application has its own copy of the library already build in.

To counter the drawbacks of having multiple instances of a library and having to rebuild the application each time the library is updated the concept of shared libraries has been developed. In current operating systems most of the systems core functionality is stored inside such dynamic libraries. Under Windows these are called Dynamic Link Libraries (DLLs), under Linux these are Shared Objects (SOs) and on MacOS these are Shared Objects or Frameworks. For simplicity, hereafter the terms "dynamic link library" or "DLL" will mark any shared dynamic libraries irrespective of the operating system they are crafted for.

Many application programs today split the functionality across several dynamic libraries to make the development process easier due to several separate modules with defined functionality. Dynamic link libraries are a way of getting independent of the current development environment, as most development systems provide an interface to the system and third party provided dynamic link libraries.

The advantages of using DLLs are:

1. The library developer can keep the internals of his library secret.
2. The library will probably work only with most programming languages, compilers, and versions.
3. A correction in the library requires a replacement of the library.
4. If multiple applications use the same library, it is used as a shared resource and conservers some memory.

The disadvantages are the following:

1. The library is loaded complete with all modules even if only a small part of the library is used.
2. The application developer cannot make changes to the library.
3. The application is not protected against reverse engineering as the APIs are visible to the outside and can be easily redirected or intercepted.
4. In addition to the application the library is a separate file that needs separate installation.
5. The application developer has no access to the complete library. It is not easy for him to find errors in the library.

Summarized, the two models used widely are static link libraries (SLL) and dynamic link libraries (DLL). From a development point of view a dynamic library has great advantages over source code libraries and a static library as it is mostly independent of the used compiler and will work together with unusual development environments.

However, from a viewpoint of protection of intellectual property and prevention of reverse engineering a dynamic link library has clear advantages as there are no openly documented and accessible interfaces available.

The update property of a static link library can be seen in both directions as on one hand a fix is easier with a dynamic library and on the other hand it is possible that a fix introduces new problems as the software is now running with a library version it has not been designed for and that has never been tested.

The object of the invention is to protect an application program, which is created to run with one ore more dynamic link libraries provided by the operating system, against reverse engineering, thereby avoiding the disadvantages connected with the use of static libraries.

This object is achieved by the method with the method steps of the characterizing part of claim 1. The object is also achieved by the computer program product with the features defined in claim 9. The object of the invention is also achieved by the method according to claim 11.

The invention is intended to be a crossover between the concepts of static link libraries and dynamic link libraries. It tries to build on the advantages of both architectures. The resulting development is on one hand independent of the used development environment. On the other hand the invention avoids the reverse engineering problem of openly accessible interfaces in dynamic link libraries. Hence, the invention builds a bridge between two different development paradigms, the paradigm of static libraries and the paradigm of dynamic link libraries.

The development of the application program itself is done using an ordinary dynamic link library (DLL). After the usual development process is completed the compiled project is converted to use the DLL like a static library or to link it "pseudo-statically".

The method according to the invention is therefore suitable to provide for all development environments a library implementation with a security that is near to the security of statically linked applications while at the same time offering the developer and the end user the convenience of not having to install additional libraries.

The method comprises or uses the following parts that interact:

1. The compiled application that is created to run with dynamic link libraries.
2. The operating system (OS), for example Windows, Linux, MacOS, Solaris.
3. Dynamic link libraries (DLLs) provided by the operating system.
4. The DLL now becoming a "pseudo-static" linked library that is to be invoked from the application.
5. A special Loader that acts as link between the application and the used DLL.
6. A software module (Preparer) that prepares the application to co-operate with the loader, whereby such preparer will integrate the loader into the application in some cases.
7. A build process converting the dynamic link library or libraries for use with the Loader or for integration of the dynamic library into the Loader.

On an operating system (OS) level, a DLL is used by specifying the used application programming interfaces (APIs) inside the application. On application start the operating system will scan the application file for these references, will load the DLL and will set references to the necessary APIs inside the application. Likewise a DLL itself can also contain references to other DLLs.

The invention now removes the references to the dynamic library and introduces additional code into the application. The additional code comprise a special Loader, which either contains or has access to the DLL to be linked and, as a startup code, sets the references to the used APIs in the correct places of the application. If additional modules or shared libraries in the same process space try to access the shared DLL that is now linked in "pseudo-statically", the loader may also redirect these references into the pseudo-statical linked library.

The simplest way to redirect the call to the DLL is to replicate the standard mechanism used by the OS to reference DLLs. On most modules this list can be continuous as it is usually under Windows or it can be split up into several parts or even be distributed as single values across the executable. For a DLL the OS fills into this list the addresses of the API functions. In the pseudo-static case the part of the list referring to the pseudostatic list is filled not by the operating system but by the special loader himself. The procedure take only minimal influence on the way the executable is loaded and is on most platforms easy to implement.

Another method for integration the DLL pseudo-statically would be not to simply replace the list as maintained by the operating system but to modify the call that references the table entry. To do this at least part of the executable has to be disassembled and analyzed. The knowledge where the API-list is helps greatly in finding the relevant parts of the executable. This method is not as easily employed as but will usually work well and will provide a higher level of protection against reverse engineering.

In addition to the call replacement it is possible to analyze the code further and to do more modifications than simply replace a call. Using such replacements it is possible to extend the protection level significantly as here software obfuscation methods can be integrated into the executable.

To make the pseudo-statical link library available not only to one module (e.g. the executable program) but to other modules (e.g. dynamic libraries) in the process space as well it is necessary to modify the dynamic loading mechanism of the operating system itself. This can be achieved by the same mechanisms described earlier, especially by the method wherein the standard mechanism used by the OS is replicated in order to redirect the call to the used DLL. With this method it is possible to redirect operating system functionality to a different implementation with a different functionality. Using this initial redirection mechanism it is possible to redirect the functions in subsequently loaded modules to the DLL.

As an example in the operating system Windows it is necessary to redirect calls such as LoadLibray, GetProcAddess. In Linux the calls would be dlopen and dlsym.

Most operating systems do not regard executables as one solid block but have a distinction into several blocks called sections or segments. Hereafter it will only be referred to sections regardless if a single OS has another terminology. In the executable there is a table directing the OS what sections are present in the executable and what exactly to do with this different sections. Depending on the OS a section containing executable code might be treated differently from a section containing data. If the section table is modified correctly it will contain one or more additional sections. These additional sections can be used to store the loader and the DLL as part of the executable. The executable also contains a description what code to start on loading the program. If this is modified correctly the OS can be forced not load the initial code of the executable but instead to call the startup code of the loader.

The loader is than responsible to transfer the control to the original startup code after it has finished its own initialization.

Alternatively the loader could be placed as appendix to the executable application program. If the developer of the executable follows certain instructions, he can leave some unused space inside the executable that is large enough to take the loader and/or the DLL. The instructions for creating such a gap in the executable are not general but have to be tailored to the used development language, compiler, and specific compiler version. For some development environments it might even be impossible to create gaps large enough to hold the loader. Identification of the gaps can be made in different ways. The developer might obtain the correct address directly from his development environment, or external links like exported symbols might be used, or the gap can be identified using a magic number or special internal data structure. But independent of the method used to identify the gap the usage is the same. The method used to find the gap may also be removed from the executable after the gap has been utilized. So an analyst will have it harder to identify the gap and the DLL stored inside.

As a third option, it is also conceivable to place the loader not internal to the executable itself but as an external dynamic link library. In this case the executable is modified that it does no longer reference the DLL as dynamic library but instead reference the loader as dynamic link library. So the OS will load and initialize the loader which in turn will fix the references to the DLL inside the executable and, if required, inside the other DLLs.

The overall process for converting the executable application program into an executable, which is protected against reverse engineering, is split up into two parts:
preparing the DLL and the loader;
modifying the application program.

The library to be linked pseudo-statically is at the beginning a dynamic link library that has been used to develop the application. In this step the DLL is either converted into a pseudo-static link library or is completely rebuilt as a pseudo-static library. A complete rebuild of the library to convert to a pseudo-static library is no real problem here as this library is only built once and should be deployed into several applications.

The preparation of the application is the mechanism by which the compiled executable application is changed so that it either incorporates the special loader itself or is prepared to co-operate with the loader. Preparing the application will usually result in the loader being a part of the application but it is also conceivable that the loader is attached as a dynamic link library to the application.

The original application would be loaded by the operating system. Than the dynamic link libraries would be loaded by the OS and the references from the application to the DLLs would be set.

After conversion, the application is loaded and most dynamic references are resolved. Only the dynamic link library that has been converted into a pseudo-static link library is not loaded. Instead the loader either dynamically creates the references or the references have already been made in the preparation phase. Additionally the loader may take care of other modules in the process room (e.g. other shared libraries) that also make use of the now pseudo-statically linked library. Here the loader has to act as part of the operating system providing the shared libraries with the corrected references to the DLL.

US 2006/070053 A1 describes a system wherein a runtime environment is not capable of loading DLLs. Instead the environment is designed to accept only applications that are linked using static libraries. In this case a change in a library requires a complete new build of the application. To circumvent this, a dynamic loader is integrated into the application that is capable to load DLLs at runtime. Moreover, this system is designed to specially use a special format for libraries and executables. Within the ELF format there is no real difference between a static and a dynamic library. Consequently for both purposes the same libraries are utilized. Effectively the system according to US 2006/070053 A1 implements a loader for DLLs and has no means to statically bind a dynamically designed library.

The present invention is further described hereinafter with reference to one of its preferred embodiments illustrated schematically in the accompanying drawings, in which.

Given a complex application program from some vendor. The vendor wants to protect the intellectual property contained in the development of his application. He decides to protect the application using cryptographic measures and a hardware dongle. The dongle provider can offer some protection using encryption tools but the vendor wants to archive more protection and decides to call some encryption routines provided by the dongle provider from inside his own code.

As the vendor used i.e. an old version of Fortran to create his application there is no direct support for him using a static link library from the dongle provider. So he is would be forced to use a dynamic link library (DLL) instead, with the consequence that a hacker could now easily introduce a modified DLL into the system which is used to intercept and record the encryption calls made by the vendors software. The hacker would be able to record the requests and the answers and would therefore be able to replay the correct answers without using the dongle at all.

To counter this threat the vendor uses a pseudo-static linking implementation provided by the dongle provider.

Figure 1:
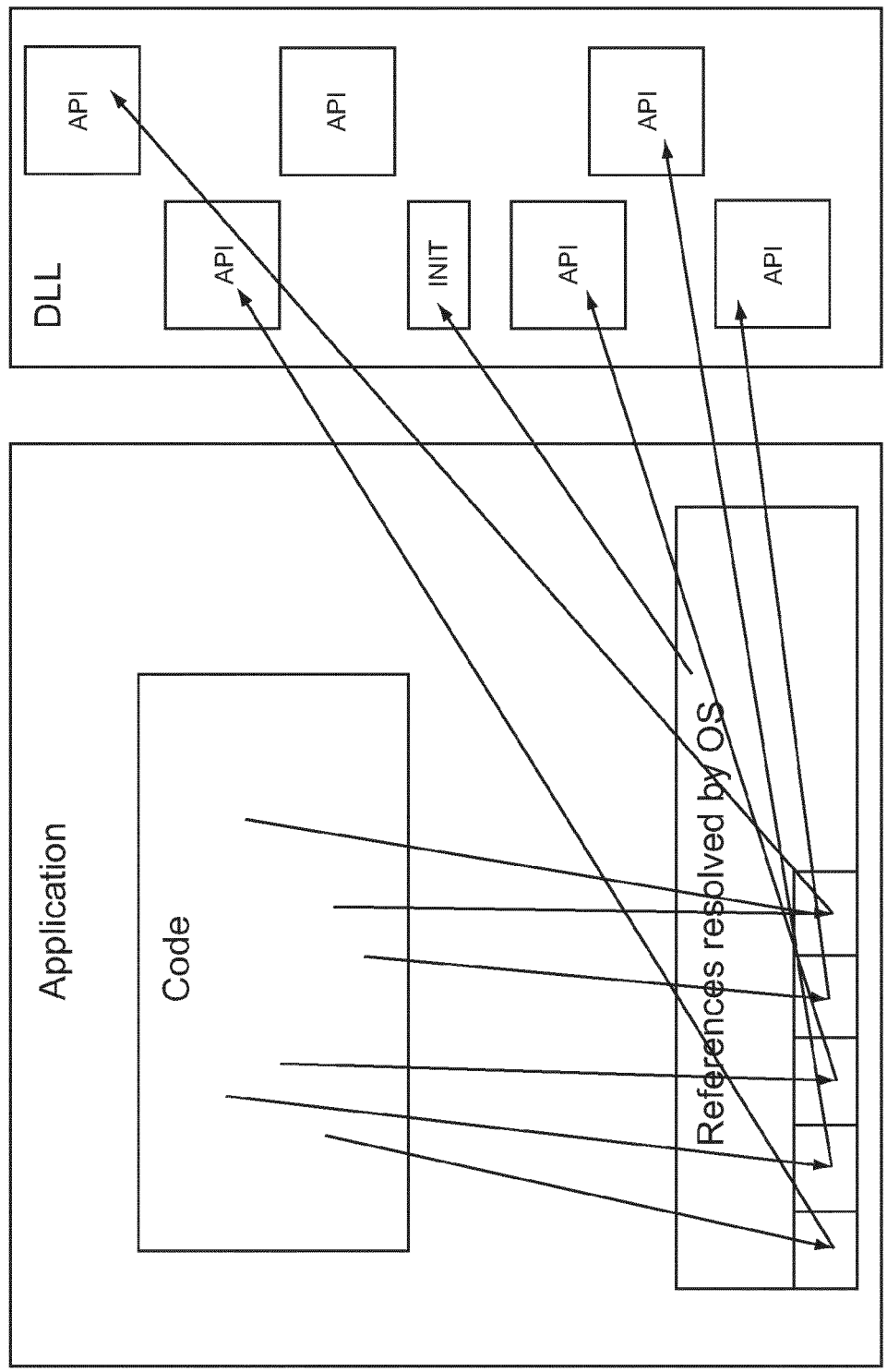
FIG. 1 shows the common mechanism of linking a dynamic link library to an executable application program.

At first, the vendor develops and tests his application using a dynamic link library which provides the needed encryption functions. The usual mechanism when starting the application is shown in FIG. 1. The original application would be loaded by the operating system (OS). Than the used dynamic link library (DLL) would be loaded and the references to the necessary Application Programming Interfaces (API) would be set by the OS.

After successful tests the vendor protects the application using a tool provided by the dongle provider. This tool modifies the executable, and besides encrypting it, removes the references to the needed DLL containing the encryption functions. Instead the tool imbeds a modified version of the DLL into the application itself.

Figure 2:
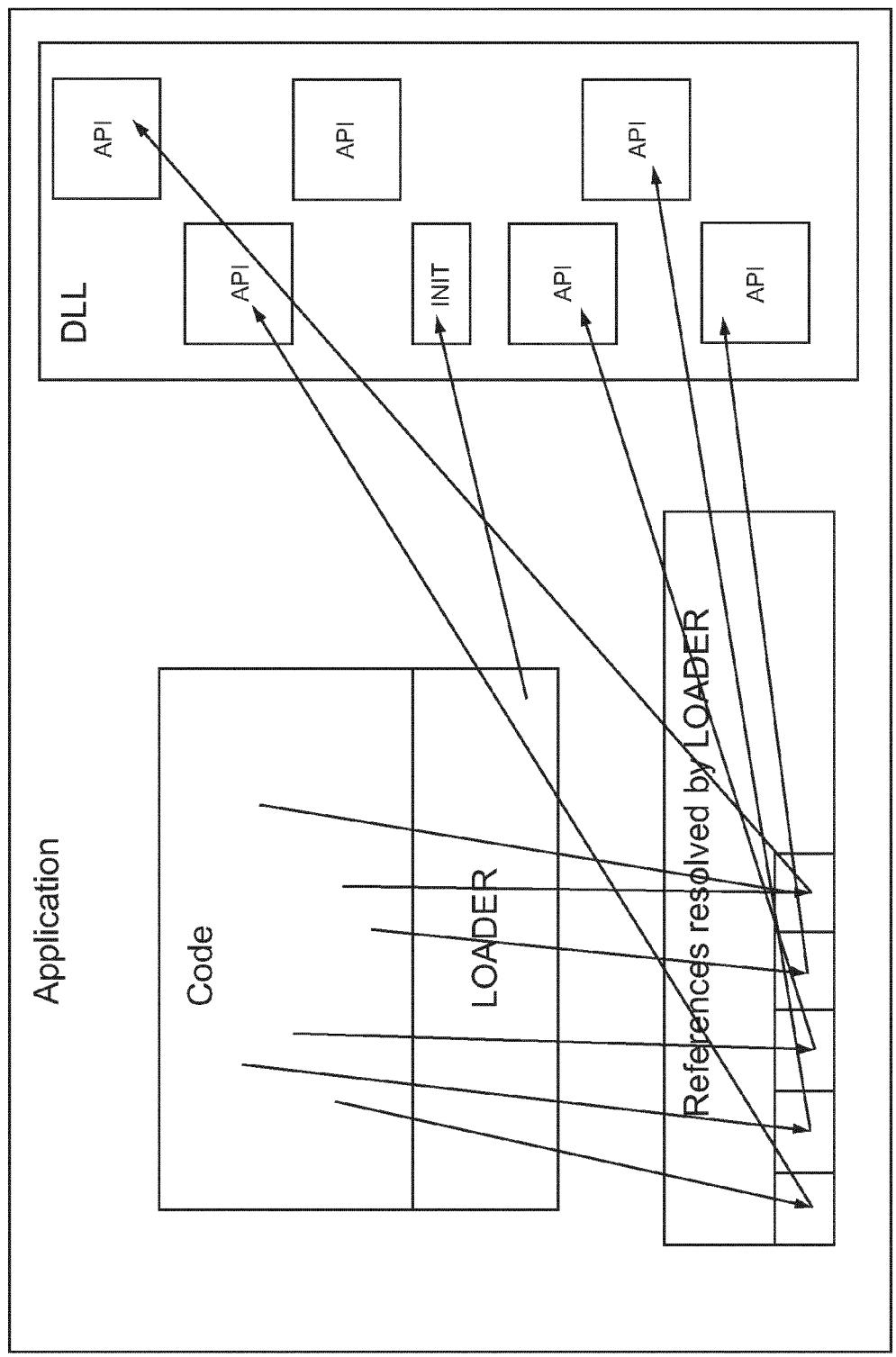
FIG. 2 shows a first method of linking a dynamic link library pseudo-statically to an executable application program by replacement the references.

As shown in FIG. 2 a specific library loader and the used DLL are attached to or embedded into the executable application, thereby using unused space within the application. The loading feature of the operating system is not modified. Instead, a modified specific version of the operating system's library loader is used to load the DLL. Upon starting the application the specific LOADER initializes the DLL by calling the initialization code INIT of the DLL. The part of the list of references referring to the used DLL is now filled by the LOADER instead of the OS. To this end the loader code, that is normally part of the operating system, has to be evaluated by the specific loader code added to the application program. This results in a statically attachment of the used DLL which became now a pseudo-static link library. When the program is compiled the attached library is a dynamic type library (DLL), but at runtime, from an operating system point of view, it looks like a static link library. It is now something between we call it a pseudo-static link library or PLL.

The linked DLL itself also has references to other DLLs, at least to some calls to the operating system. If the DLL would merely be added to the program without loader code the proper usage of the DLL would not be given. Also the DLL itself has code that has to be invoked to initialize the DLL. When the DLL would simply be added to the executable this necessary initialization code would never be called.

Figure 3:
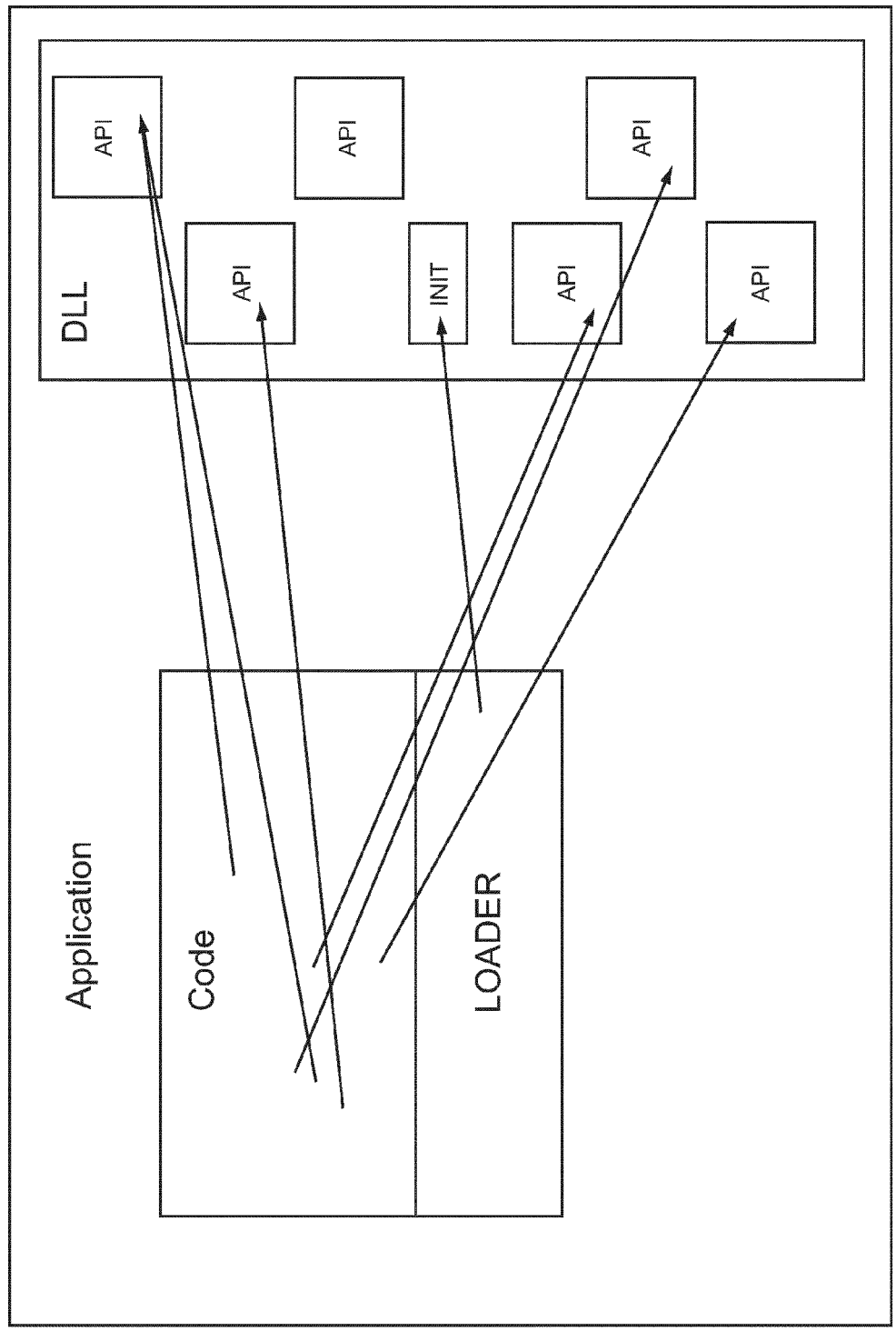
FIG. 3 shows a second method of linking a dynamic link library pseudo-statically to an executable application program by calling directly.

An alternative method for integration the used DLL is not simply replace the list of references as maintained by the OS but to modify the call that references the table entry. In FIG. 3 the additional code introduced into the application causes direct calls of the used DLL, which now is a pseudo-static link library (PLL). The LOADER only calls the initialization code INIT of the DLL.

To a hacker the application now presents itself as a monolithic application without the vulnerable interface to a DLL. To the developer, however, the application uses a simple DLL interface. For the dongle provider the customer uses a secure integration without the dongle provider having the necessity to provide static link libraries for all possible development environments.

What is claimed is:

1. A method for protecting an application program, executable on a computer, against reverse engineering, said application program being created to run with at least one selected dynamic link library (DLL) on said computer, comprising:
    adding a specific dynamic link library loader to an executable application program, said specific dynamic link library loader either contains or has access to a dynamic link library (DLL), wherein the DLL contains encryption functions;
    modifying the references in the application program to said DLL such that upon loading said application program and said specific dynamic link library loader into a main memory of the a computer, said DLL is initialized by said dynamic link library loader instead of by the operating system, thereby statically attaching the DLL to the application program; and
    embedding the thus modified version of the DLL into the application program.

2. The method according to claim 1, wherein, upon loading the application program in the main memory of the computer, a list of references maintained by the operating system in order to link said DLL to the application is replaced at least partly by a list referring to said DLL.

3. The method according to claim 1, wherein, upon loading the application program, a call that references a table entry is changed so that the DLL is called directly.

4. The method according to claim 1, wherein the dynamic link library loader and the DLL are placed as appendices to the application.

5. The method according to claim 1, wherein the dynamically linked library loader is stored into the application, thereby using unused space within the application.

6. The method according to claim 1, further comprising:
    placing the dynamic link library loader itself as an extended dynamic link library; and
    modifying the application such, that it does no longer references the DLL to be linked but instead references the dynamic link library loader.

7. The method according to claim 1 wherein other shared dynamic link libraries in a process space are provided by said loader with the correct references to said DLL.

8. A computer readable, non-transitory medium, on which is stored a program product comprising:
    an application program executable on a computer;
    at least one selected dynamic link library (DLL) on said computer, said at least one selected DLL being adapted to be linked to said application program, the at least one DLL containing encryption functions;
    wherein a specific library loader is added to the executable application program, said specific library loader either contains or has access to said at least one selected DLL and is adapted to initialize said at least one selected DLL to be used and to set references to said at least one selected DLL in the correct places of the application program, thereby attaching said at least one selected DLL statically to the application program, the thus modified version of said at least one selected DLL being embedded into the application program.

9. The computer readable, non-transitory medium according to claim 8, wherein the specific library loader is stored into the application program, thereby using unused space within the application.

10. A method for linking a selected dynamic link library (DLL) containing encryption functions to an executable application program upon starting the application running on a computer, comprising:
    loading a dynamic link library loader together with said application program into the main memory of said computer, said dynamic link library loader either contains or has access to said selected DLL;
    wherein said dynamic link library loader is embedded into the application program; and
    initializing said selected dynamic link library (DLL) by said dynamic link library loader instead of the operating system, thereby statically attaching the selected DLL.

11. The method according to claim 10, wherein the specific dynamic link library loader is part of the application program.

12. The method according to claim 10, wherein the references referring to said selected DLL are filled out by said specific loader instead of an operating system.

13. A computer readable, non-transitory medium on which is stored instructions that, when read by a computer, cause the computer to perform a process for protecting against reverse engineering an application program executable on a computer, said application program being created to run with at least one selected dynamic link library (DLL) containing encryption functions on said computer, the process comprising:
    adding a specific dynamic link library loader to an executable application program, said specific dynamic link library loader either containing or having access to a selected DLL;
    modifying the references in the application program to said DLL such that upon loading said application program and said specific dynamic link library loader into a main memory of the a computer, said DLL is initialized by said dynamic link library loader instead of by the operating system, thereby statically attaching the said DLL to the application program;
    embedding the thus modified version of said DLL into the application program.

14. The computer readable, non-transitory medium of claim 13, wherein, upon loading the application program in the main memory of the computer, a list of references maintained by the operating system in order to link said DLL to the application is replaced at least partly by a list referring to said DLL.

15. The computer readable, non-transitory medium of claim 13, wherein, upon loading the application program, a call that references a table entry is changed so that the DLL is called directly.

16. The computer readable, non-transitory medium of claim 13, wherein the dynamic link library loader and the DLL are placed as appendices to the application.

17. The computer readable, non-transitory medium of claim 13, wherein the DLL and the dynamically linked library loader are stored in the application, thereby using unused space within the application to be protected.

18. The computer readable, non-transitory medium of claim 13, wherein the process further comprises:
   placing the dynamic link library loader itself as an extended dynamic link library; and
   modifying the application such, that it does no longer references the DLL to be linked but instead references the dynamic link library loader.

19. The computer readable, non-transitory medium of claim 13, wherein other shared dynamic link libraries in a process address space are provided by said loader with the correct references to said linked library.

20. A computer readable, non-transitory medium on which is stored instructions that, when read by a computer, cause the computer to perform a process for linking a selected dynamic link library (DLL) containing encryption functions to an executable application program upon starting the application running on a computer, the process comprising:
   loading a specific dynamic link library loader together with said application program into the main memory of said computer, said dynamic link library loader either contains or has access to said selected DLL;
   wherein said dynamic link library loader is embedded into the application program;
   initializing said selected DLL by said dynamic link library loader instead of an operating system, thereby statically attaching the selected DLL.

21. The computer readable, non-transitory medium of claim 20, wherein the DLL and the specific dynamic link library loader are stored in the application program.

22. The computer readable, non-transitory medium of claim 20, wherein references in the application referring to said selected DLL are filled out by said specific loader instead of an operating system.

* * * * *